Figure 1:
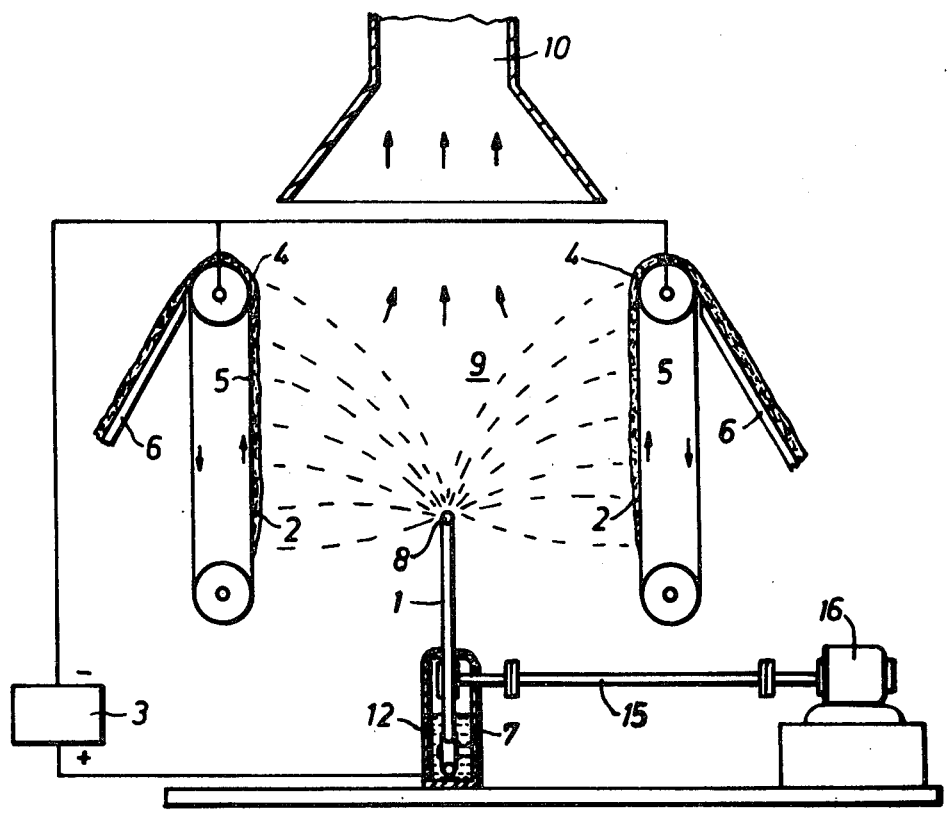

United States Patent [19] [11] 4,143,196
Simm et al. [45] Mar. 6, 1979

[54] FIBRE FLEECE OF ELECTROSTATICALLY SPUN FIBRES AND METHODS OF MAKING SAME

[75] Inventors: Walter Simm; Claus Gösling, both of Leverkusen; Richard Bonart, Regensburg; Béla von Falkai, Gohr, all of Fed. Rep. of Germany

[73] Assignee: Bayer Aktiengesellschaft, Leverkusen, Fed. Rep. of Germany

[21] Appl. No.: 813,720

[22] Filed: Jul. 7, 1977

Related U.S. Application Data

[63] Continuation-in-part of Ser. No. 416,316, Nov. 15, 1973, Pat. No. 4,069,026, which is a continuation-in-part of Ser. No. 155,189, Jun. 21, 1971, abandoned.

[30] Foreign Application Priority Data

Jun. 29, 1970 [DE] Fed. Rep. of Germany ....... 2032072

[51] Int. Cl.² ........................................... B01D 35/06
[52] U.S. Cl. ............................ 428/212; 55/DIG. 39; 156/62.4; 156/62.8; 264/8; 264/10; 264/24; 264/113; 264/114; 264/115; 264/123; 427/31; 428/286; 428/297; 428/304; 428/332; 428/398; 428/400; 428/409; 428/903

[58] Field of Search ................. 264/24, 108, 112, 113, 264/114, 115, 123; 427/31, 32; 428/398, 400, 409, 903, 296, 280, 286, 330, 359, 360, 401, 212, 297, 332, 304; 55/6, 527, 528, DIG. 39, 103, 487; 118/626; 156/62.4, 62.8

[56] References Cited

U.S. PATENT DOCUMENTS

| 2,795,290 | 6/1957 | Butsch et al. ........................... 55/103 |
| 2,810,426 | 10/1957 | Till et al. ................................. 264/24 |
| 2,888,095 | 5/1959 | Perrini et al. ........................... 55/487 |
| 3,280,229 | 10/1966 | Simons .................................... 264/10 |
| 3,338,992 | 8/1967 | Kinney .................................... 264/24 |
| 3,400,520 | 9/1968 | Sakurai ................................... 55/487 |
| 3,406,660 | 10/1968 | Simm ..................................... 118/626 |
| 3,689,608 | 9/1972 | Hollberg et al. ........................ 264/24 |

Primary Examiner—Michael W. Ball
Attorney, Agent, or Firm—Sprung, Felfe, Horn, Lynch & Kramer

[57] ABSTRACT

In a process for the production of fibre filters, the fibre material is sprayed electrostatically from the liquid state and deposited as a fibre fleece on a conductive support. The starting materials used are solutions of high polymers in readily volatile solvents. The filters obtained have substantially improved properties.

9 Claims, 2 Drawing Figures

FIBRE FLEECE OF ELECTROSTATICALLY SPUN FIBRES AND METHODS OF MAKING SAME

This application is a continuation-in-part of application Ser. No. 416,316, filed Nov. 15, 1973, now U.S. Pat. No. 4,069,026, and which is a continuation-in-part of Ser. No. 155,189, filed June 21, 1971 now abandoned. The specification herein duplicates the specificiation in said Ser. No. 155,189. The invention relates to a process for the production of fibre filters and in particular, it relates to fibre filters produced by this process. Processes are known by which various types of spun fibres are processed on textile machines such as carding machines or stitching machines to produce fibre fleeces, the fibre structure of which is such that particles of dust contained in a gas flowing through the fleece are retained by the fibres, so that such fleeces may be used as air filters. The efficiency of such filters depends to a large extent on the fineness and density of the fibres. Another important influence on the filtering action is the electrostatic charge of the fibres, which produces powerful, non-homogeneous electric fields inside the fleece, by means of which the charged or uncharged particles of dust are deposited on the fibre surface where they are retained by adhesive forces. Charges of this kind may be produced e.g. by friction in the fibre material while it is being processed to form a fleece. It is also known to use for this purpose fibre mixtures which are made of various materials which take up different charges as the result of friction against each other so that potential differences and non-homogeneous electric fields are produced between the fibres.

The best filtering effects may be expected when very fine fibres can be combined with powerful and stable electric charges.

The conventional spinning processes provide fibre thicknesses which are generally above 10, $\mu$m. Fine fibres are required for producing fine dust filters and "absolute filters" which will efficiently retain particles of the order of less than 0.5 $\mu$m.

It is an object of the invention to develop a process by which very fine fibres can easily be produced to form a fleece in which high electrostatic charges have been generated at the production stage.

The solution to this problem consists according to the invention in that a finished fibre fleece is produced by an electrostatic spinning process in which the fibre material is sprayed electrostatically in known manner from the liquid state and deposited on a conductive support. Very thin, relatively short and highly charged fibres are obtained in large numbers. They are deposited in a uniform distribution on the conductive support where they form a complete fleece which can be lifted off when the installation has been switched off.

The principle of producing fibres from fibre forming liquids has been known for a long time (see e.g. German Pat. No. 689,870) but the process has not reached the stage of technical application because the fibres were unsuitable for the textile industry and the electrode arrangements used for spinning could not be used in continuous operation because the technical defects were too great.

Fibres having thicknesses of less than 1 $\mu$ can be produced by the electrostatic process. The fibres are frequently in the form of bands and when viewed in the electron microscope they are found to have a very porous surface structure.

Since fleeces made of very thin fibres may be soft and liable to be damaged by contact, it is in many cases advantageous to protect the upper and lower boundary layer by thinner support layers which are permeable to gas. For this purpose, the fibre material is deposited on precipitation electrodes whose surface is covered with a self-supporting support layer which is gas-permeable. The support layer is advantageously made of a conventionally produced fabric or fibre fleece which has a fairly coarse structure. When producing the filters in accordance with the invention, the precipitation electrode is covered with this fabric and then directly sprayed electrostatically with the fine fibres.

The spinning liquids used are advantageously solutions of high polymers in readily volatile organic solvents. Suitable high polymers are, for example, polystyrene, cellulose esters or polycarbonate. The solvents used may advantageously be non-combustible liquids such as methylene chloride, chloroform, carbon tetrachloride and the like.

It is understandable that incrustations are readily formed on the electrode surface due to the rapid evaporation of the solvent. For this reason, the known form of electrodes used for lacquer spraying such as rotating bells, discs or fixed spray edges are not suitable for the spinning process because the spray process would be blocked after a short time by the dried up liquid at the spray edge.

It has now been found that these disadvantages can be obviated by spraying from a rotating annular electrode. The used surface of the annular electrode is always drawn completely through the liquid bath in which the dried residues are cleaned off and the electrode is rewetted. Electrode designs of this type are already known for the production of aerosals.

It has also been found that the thickness of the fibres can be influenced by the electric conductivity of the spinning liquid. It increases with decreasing conductivity of the liquid. It has been found that fibre thicknesses which are especially suitable for producing the filters can only be spun from liquids which have an electric conductivity in the region of from $10^{-9}$ Ohm$^{-1}$cm$^{-1}$ to $10^{-4}$ Ohm$^{-1}$cm$^{-1}$. The conductivity can in most cases be adjusted to the required value by adding to the spinning liquid a suitable quantity of organic salts which form ions. The conductivity may also be altered by the suitable action of various solvents or of the dissolved substances.

The air temperature and relative humidity also have a marked influence on the formation of thin, dry threads. It has been found that the optimum conditions for producing good fibre fleeces are at air temperatures of between 20° C and 30° C and and relative humidities of less than 40%.

The filter action of the fibre fleeces for minute dust particles is due to a considerable extent to the action of electric fields between the fibres. To increase the field strength, it is necessary to produce higher potential gradients within the fleece. According to a further development of the invention, the greatest potential differences can be obtained when the filter layer is composed of partial fibre layers with positive and negative charges, the alternating charge on the partial layers being produced by spraying the fibre substances with spray electrodes of alternating polarity.

Owing to the low conductivity of dry, thin fibres of high polymers, charges produced in this way are retained within the layer for several months.

The efficiency of the fibre filters can be further improved by incorporating coarse and fine fibres into the fleece, the coarse fibres providing a mechanically sturdy structure and the fine fibres advantageously providing the effective filtering component. This effect can be achieved by successively spraying different spinning solutions of higher and lower conductivity and depositing the resulting fibres on the same support.

The fibre filters produced by the process according to the invention thus consist of a fibre fleece which has been electrostatically sprayed from the liquid state on to a conductive support. The electrostatically sprayed fibre fleece is advantageously covered with a gas permeable support layer on one or on both sides.

The spinning solutions for spraying advantageously consist of solutions of high polymers in readily volatile organic solvents.

These spinning solutions advantageously contain additives which render them conductive so that their conductivity will be in the region of from $10^{-9} Ohm^{-1}cm^{-1}$ to $10^{-4} Ohm^{-1}cm^{-1}$.

Another improvement of the fibre filters according to the invention is characterised in that the filter layer is composed of several partial layers with positive and negative charges. Fibre filters having several fibre layers superimposed on each other were also produced. These fibre layers were sprayed from spinning solutions of different conductivities. The fibre filters produced in this way also have very advantageous properties. The process according to the invention will now be further described with reference to the drawings. In the drawings.

Figure 2:
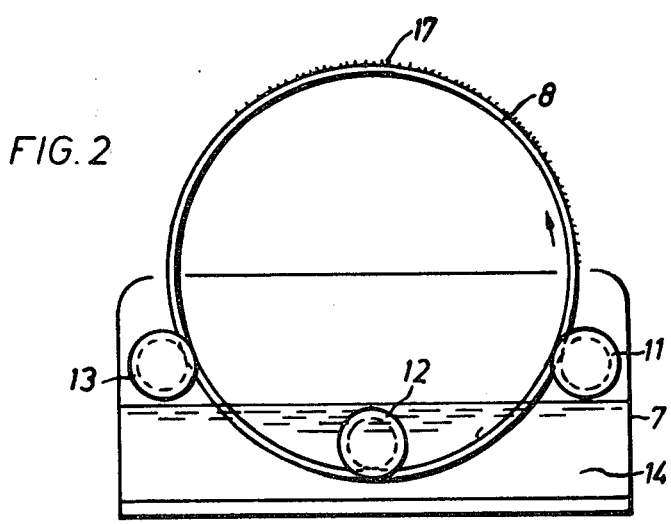

FIG. 1 shows an installation for the production of fibre fleeces under the action of powerful electric fields and FIG. 2 shows the annular spray electrode. The whole installation consists in principle of a spray electrode 1 from which the spray liquid is sprayed and precipitation electrodes 2 on which the electrically charged fibres are deposited. The voltage between the electrodes is between 50 and 200 kV. The electric supply to the installation is from the high voltage source 3. The deposited fibre material 4 is carried out of the spray zone by movable electrodes, e.g. conveyor belts 5. The stripper 6 serves for the continuous removal of the deposited fibre material. The solutions which are to be spun are contained in the storage tank 7 from which the spinning liquid is continuously removed by the annular electrode 8 and carried into the spray chamber 9 where the spinning process takes place. The solvent vapours produced are discharged through an exhaust vent 10.

FIG. 2 shows the annular electrode in side view. The annular electrode 8 is rotatably mounted on rollers 11, 12 and 13 and dips with its lower part into the spinning liquid 14. The drive is provided by the insulating shaft 15 via the transmission 16 (FIG. 1).

On rotation in the direction of the arrow, a thin layer of liquid on the surface of the ring is carried to the outside where it can be sprayed under the influence of the electric field. Numerous liquid points 17 which merge into thin spinning threads at the end are formed on the exposed part of the ring by the action of the field on the liquid film. The spinning threads become detached and solidify by evaporation of the solvent. When they detach themselves, the threads are highly charged and owing to their charge they move in the electric field towards the precipitation electrode where they are deposited to form a fleece.

EXAMPLE 1

A spinning liquid is prepared from a 10% solution of polystyrene (molecular weight approximately 180,000) in methylene chloride. The electric conductivity of the solution is $\chi = 2.10^{-7} Ohm^{-1}cm^{-1}$. The spray electrode is an annular electrode as shown in FIG. 2 having a diameter of 1 m. The distance from the precipitation electrodes arranged on the two sides of the ring is in each case 0.5 m. There is a voltage of 120 kV between the ring and the precipitation electrodes, the ring being positive. The ring rotates at a rate of 30 revs/min during the spray process. A fleece of 2 to 3 mm in thickness of dry, porous polystyrene fibres which have different thicknesses, the average thickness being about 20 $\mu m$, is formed after a few minutes on the precipitation electrodes which are covered with thin, highly permeable cellulose fleeces which have been produced by conventional methods. An air filter which is immediately ready for use and which is practically impermeable to dust particles in the air which have a particle diameter of more than 0.5 $\mu m$ is obtained by removing this coated support fleece from the electrodes and placing two layers together with the surfaces which are not covered by the support fleece in contact.

EXAMPLE 2

A 12% solution of polycarbonate (molecular weight about 50,000) in methylene chloride has a conductivity of $x = 1.10^{-8} Ohm-1cm^{-1}$. The conductivity is increased to $1.10^{-6} Ohm^{-1}cm^{-1}$ by the addition of a few drops of a concentrated solution of dimethyltetradecyl-benzylammonium bromide in methanol to 1 l of spinning liquid. This spinning liquid is sprayed in the apparatus described in Example 1. A fibre filter in which the fibres have a band shaped appearance and an average thickness of 5–10 $\mu m$ is obtained. The surface of each fibre is permeated with pores of 0.1 to 0.2 $\mu m$. The filter effect is practically complete for dust particles greater than 0.3 $\mu m$.

EXAMPLE 3

A 12% solution of polyacrylonitrile in dimethylformamide has the extremely high conductivity of $1.10^{-4} Ohm^{-4}cm^{-1}$. An extremely finely fibred fleece having fibre thicknesses of about 0.4 $\mu m$ and a very efficient filter action is obtained by spraying the spinning liquid from the positive annular electrode described in Example 1.

What is claimed is:

1. An article comprising several layers of fiber fleeces each produced by electrostatically spraying a solution having a conductivity of $10^{-9} Ohm^{-1}cm^{-1}$ to $10^{-4} Ohm^{-1}cm^{-1}$ of a polymer in a volatile solvent between an electrode wetted by the solution and a conductive support for spraying of the solution, evaporation of the solvent, and collection of the polymer as the fibre fleece on the support, the polymer being polycarbonate and the fibers of the fleece having a porous surface structure, said layers, respectively, having positive and negative charges.

2. An article according to claim 1, wherein the fibres of the fibre fleeces have a porous surface structure.

3. An article according to claim 1, wherein each layer is produced from a solution of different conductivity.

4. An article according to claim 1, wherein the fibre fleeces include fibres of thickness less than 1 $\mu m$.

5. Process of producing a fleece of polymeric fibres which comprises electrostatically spraying a solution having a conductivity of $10^{-9}$Ohm$^{-1}$cm$^{-1}$ to $10^{-4}$Ohm$^{-1}$cm$^{-1}$ of a polymer in a volatile solvent between an electrode wetted by the solution and a conductive support for spraying of the solution, evaporation of the solvent, collection of the polymer as the fibre fleece on the support, the polymer being polycarbonate and the fibres of the fleece having a porous surface structure, impressing charges of opposite polarity on the electrode and the support and alternating the polarity to provide the fleece composed of layers with positive and negative charges.

6. Process according to claim 5, further comprising electrostatically spraying solutions of different conductivity onto the support to incorporate coarse and fine fibres into the fleece.

7. Process according to claim 5, further comprising providing the fibre fleece including fibres of thickness less than 1 $\mu$m.

8. Process according to claim 5, further comprising providing a gas permeable support layer on the conductive support and collecting the fibres on the gas permeable support layer.

9. Process according to claim 8, wherein the solution is maintained in a vessel therefor and said electrode is a rotating annular electrode only partially immersed in the solution, the solution being sprayed from that part of the electrode not immersed in the solution.

* * * * *